(12) United States Patent
Hennessy et al.

(10) Patent No.: US 11,939,711 B2
(45) Date of Patent: Mar. 26, 2024

(54) REUSEABLE WRAPPING ORNAMENT WITH PERFORATION FOR AIDING REMOVAL

(71) Applicants: Daniel Patrick Hennessy, Reno, NV (US); Kristen Elaine Hennessy, Reno, NV (US)

(72) Inventors: Daniel Patrick Hennessy, Reno, NV (US); Kristen Elaine Hennessy, Reno, NV (US)

(73) Assignee: HENNESSY GIFT WRAP, Reno, NV (US)

( * ) Notice: Subject to any disclaimer, the term of this patent is extended or adjusted under 35 U.S.C. 154(b) by 673 days.

(21) Appl. No.: 15/929,402

(22) Filed: Apr. 30, 2020

(65) Prior Publication Data

US 2021/0087724 A1    Mar. 25, 2021

Related U.S. Application Data

(63) Continuation-in-part of application No. 16/582,717, filed on Sep. 25, 2019, now Pat. No. 11,236,252.

(51) Int. Cl.
*D04D 7/10* (2006.01)
*D04D 11/00* (2006.01)

(52) U.S. Cl.
CPC .............. *D04D 7/10* (2013.01); *D04D 11/00* (2013.01)

(58) Field of Classification Search
None
See application file for complete search history.

(56) References Cited

U.S. PATENT DOCUMENTS

| | | |
|---|---|---|
| 5,004,144 A | 4/1991 | Selga |
| 2002/0071919 A1 | 6/2002 | Levesque |
| 2003/0096066 A1 | 5/2003 | Clark |

OTHER PUBLICATIONS

Double Sided Tape Strips Product Examples, TAPESTRIPS, available at: https://www.tapestrips.com/double-sided-tape, 1 page.

*Primary Examiner* — Christopher T Schatz
(74) *Attorney, Agent, or Firm* — Mark A. Goodman; Goodman Law Center (57) ABSTRACT

A reusable decorative ornament for use on wrapping paper or the like includes an ornamental element such as a ribbon flower or bow. The ornament includes an attachment element for securing the ornament to wrapping paper. The attachment element includes a stack of adhesive elements. By selectively exposing an adhesive layer, the decorative ornament can be used multiple times. The adhesive elements may be secured to the ornament element by a fixed device such as a staple. Each adhesive layer may include a fixed portion in the area of the staple. Perforations may divide the fixed portion from a removable portion of the layer to facilitate easy removal and reuse of the decorative ornament.

9 Claims, 11 Drawing Sheets

REUSEABLE WRAPPING ORNAMENT WITH PERFORATION FOR AIDING REMOVAL

CROSS REFERENCE TO RELATED APPLICATIONS

This application is a continuation-in-part and claims the benefit of U.S. patent application Ser. No. 16/582,717 filed 25 Sep. 2019, the entire contents of which are incorporated herein by reference.

FIELD OF THE INVENTION

The present invention relates to ornamental devices and in particular ornaments used in wrapping of presents, gifts, and other objects that can be wrapped.

BACKGROUND OF THE INVENTION

Decorative wrapping is a common practice. Many decorative ornaments may be used in wrapping of gifts or presents, including, without limitation, bows, ribbons, etc. Many ornamental devices may also be made from ribbon material, such as ornamental flowers. Other materials may be used for forming decorative wrapping ornaments.

Wrapping is largely single use and disposable. Thus, the motivation to use decorative ornaments that can add expense to the cost of wrapping may be reduced. With a push towards minimizing single use items, there is a further requirement for alternative decorative wrapping ornaments.

SUMMARY OF THE INVENTION

Advantages of One or More Embodiments of the Present Invention

The various embodiments of the present invention may, but do not necessarily, achieve one or more of the following advantages:

the ability to decorate wrapping;
provide a reusable wrapping ornament;
reduce the disposability and single-use nature of wrapping ornaments;
provide an aesthetic yet functional wrapping ornament.

These and other advantages may be realized by reference to the remaining portions of the specification, claims, and abstract.

Summary of One or More Embodiments of the Present Invention

In one aspect of the present invention, there is provided a decorative wrapping ornament. The ornament may include an ornament element and a reusable attachment element secured to the ornament. The reusable attachment element may include a plurality of selectively exposable adhesive elements. The plurality of selectively exposable adhesive elements may comprise at least one fixed portion and at least one removable portion separated by at least one perforation. At least one fixing device may fix the reusable attachment element to the ornament element. The at least one fixing device may pass through the fixed portion of the plurality of selectively exposable adhesive elements.

In one aspect of the present invention, there is provided a method for applying a decorative ornament to wrapping. The decorative ornament may comprise an ornament element and a reusable attachment element comprising a plurality of selectively exposable adhesive elements. The method may comprise selectively exposing a first adhesive element of the plurality of adhesive elements and applying the first adhesive element to first wrapping to secure the decorative ornament to the first wrapping. The decorative ornament may be removed from the first wrapping. A second adhesive element of the plurality of adhesive elements may be selectively exposed and the second adhesive element may be applied to second wrapping. Removing the decorative ornament from the first wrapping may comprise separating at least one removable portion of the first adhesive element from at least one fixed portion of the first adhesive element.

In one aspect of the present invention, there is provided a decorative wrapping ornament. The decorative wrapping ornament may include ornament means and reusable attachment means secured to the ornament means. The reusable attachment means may comprise a plurality of selectively exposable adhesive means for adhering the decorative ornament to the wrapping. The plurality of selectively exposable adhesive elements may comprise at least one fixed portion and at least one removable portion separated by perforation means. Fixing means may fix the reusable attachment means to the ornament means.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DETAILED DESCRIPTION OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized, and structural changes may be made without departing from the scope of the present invention.

Figure 1:
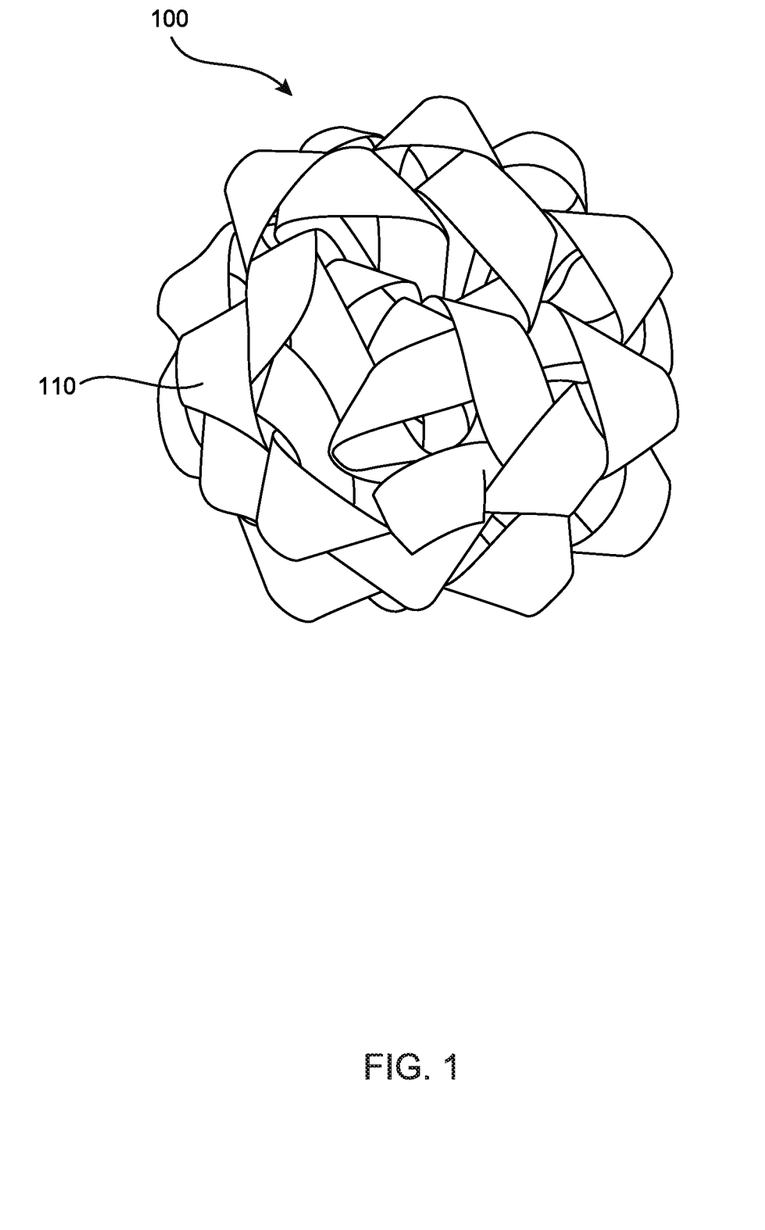
FIG. 1 substantially shows an ornament side view of a wrapping ornament in accordance with an embodiment of the present invention.
Figure 2:
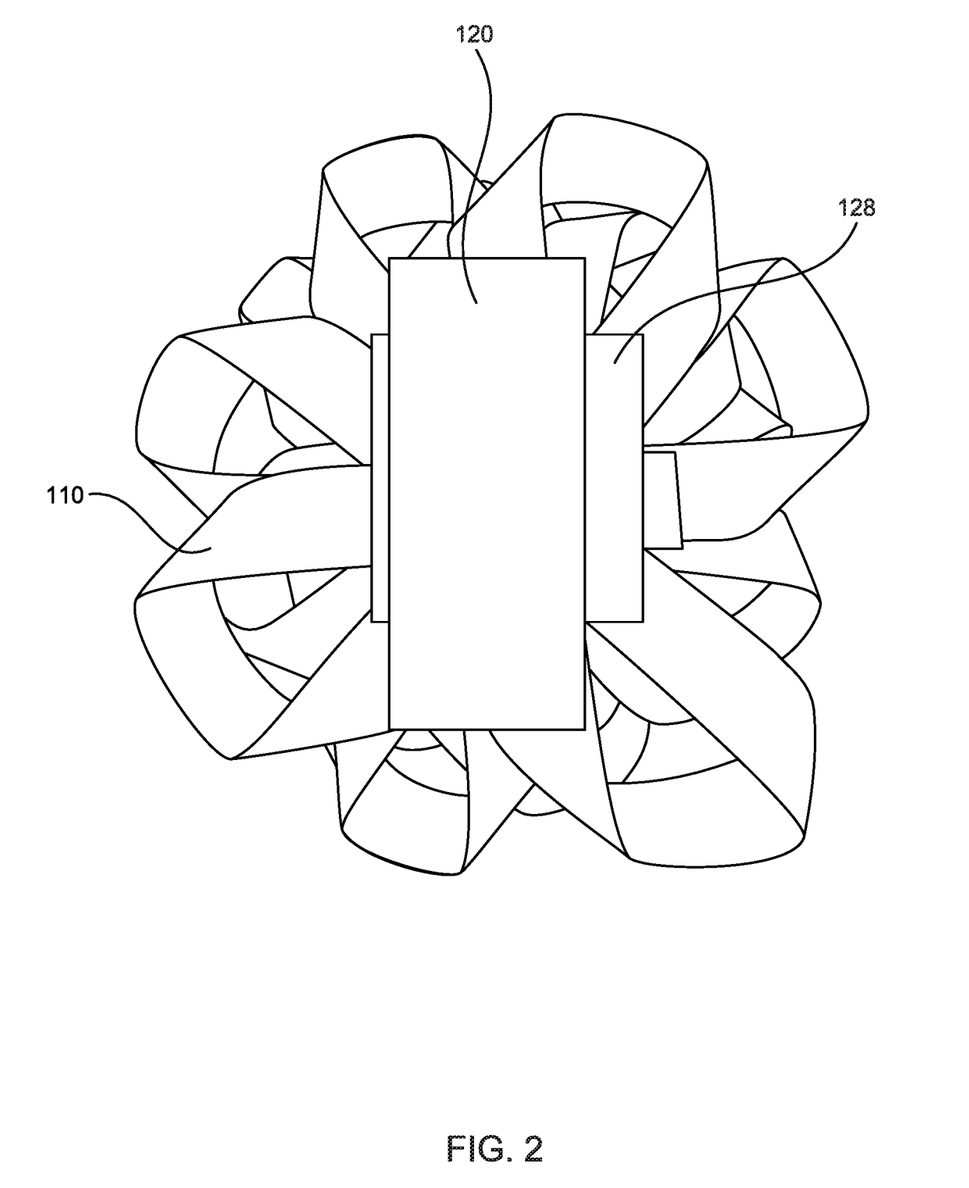
FIG. 2 substantially shows an attachment side of the wrapping ornament of FIG. 1.

An embodiment of a decorative wrapping ornament is depicted in FIGS. 1 and 2. The ornament 100 includes an ornament element 110 and an attachment element 120. The ornament element 110 may be any particular decorative wrapping ornament. Ornament elements may include bows, ribbon flowers, animal shapes, etc. The ornamental element may be shaped from ribbon. The material of the ornamental element may be any suitable material including plastic, fabric, cloth, felt metal, wood, etc. In the particular embodiment depicted, the ornament element 110 is a flower shaped from a polyester ribbon material.

Figure 3:
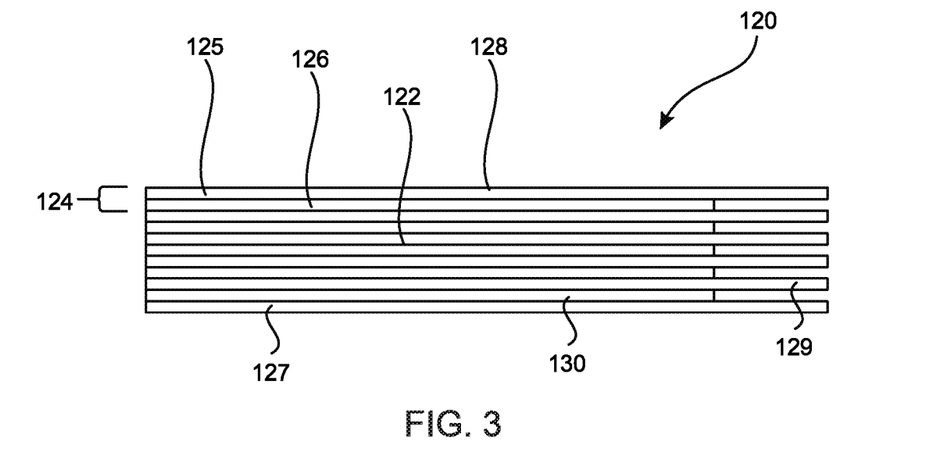
FIG. 3 substantially shows a schematic side view of a stack of adhesive elements.

As shown in FIG. 3, the attachment element 120 includes a hangtag 128 and a stack 122 of adhesive tape layers 126 separated by release liners 125. The adhesive tape layer 126 may be a thin, clear, flexible double-sided adhesive layer.

The release liner 125 is provided between layers of the tape substrate 126. The release liner 125 may be a thin paper, card or plasticized layer and is relatively weakly bonded to the tape substrate. Removing the release liner from a surface of the tape substrate 126 activates the adhesive on that surface so that that surface may then be strongly bonded onto another surface, such as a surface of the wrapping. Adhesive stacks of the type herein described are known and may be available, for example from the 3M group of companies.

The outermost release liner 127 of the stack 122 (bottom layer in FIG. 3) protects the adhesive layers which allows the product to be shipped without sticking to other products. The hangtag 128 (FIG. 3) may be secured to the ornament element 110 (FIG. 2) through suitable fasteners including, without limitation, staples, adhesives, rivets, etc. The bottom portion of the stack 122 may be secured directly to the ornament 110, e.g. by removing the hangtag 128 to expose the underlying adhesive and the adhering the bottom portion of the stack 122 to the ornament element 110. The hangtag 128 material can be cardboard, release liner, card stock, or another suitable material.

The release liners 125 are each longer than the adhesive tape layer 126 and thus have a tab 129 that remains unbonded. The tab allows the release liner to be easily gripped by the user so that the release liner can then be pulled to remove the release liner 125 from the underlying tape layer 126.

Figure 4A:
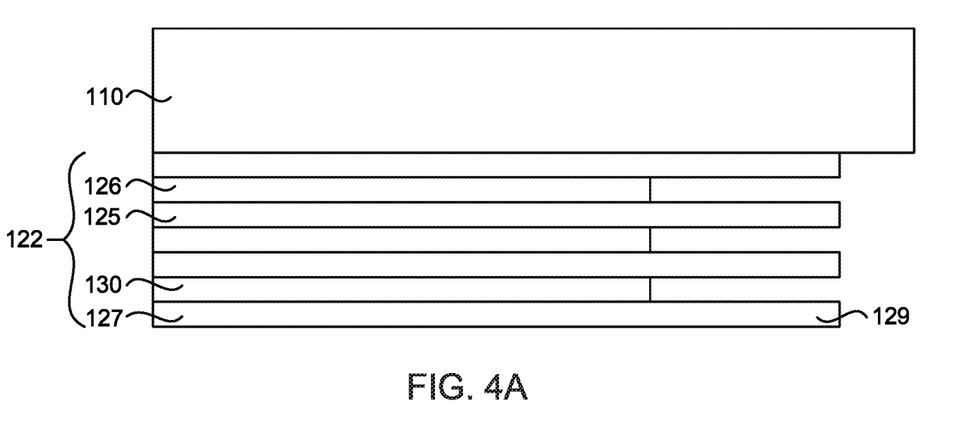
FIG. 4A to FIG. 4D show a process for reusing the wrapping ornament.
Figure 4B:
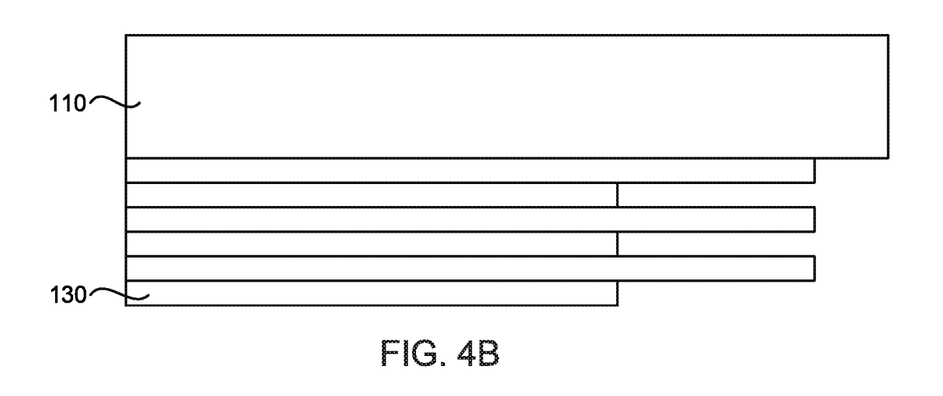
Figure 4C:
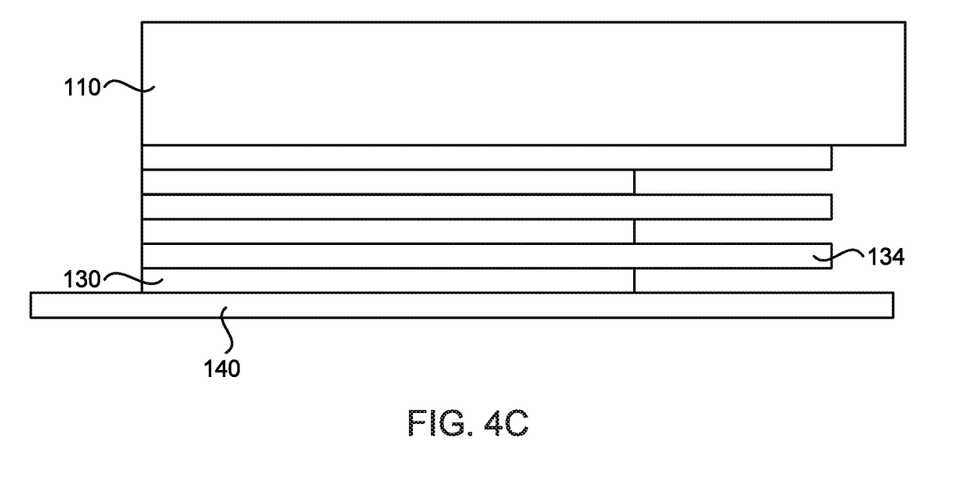
Figure 4D:
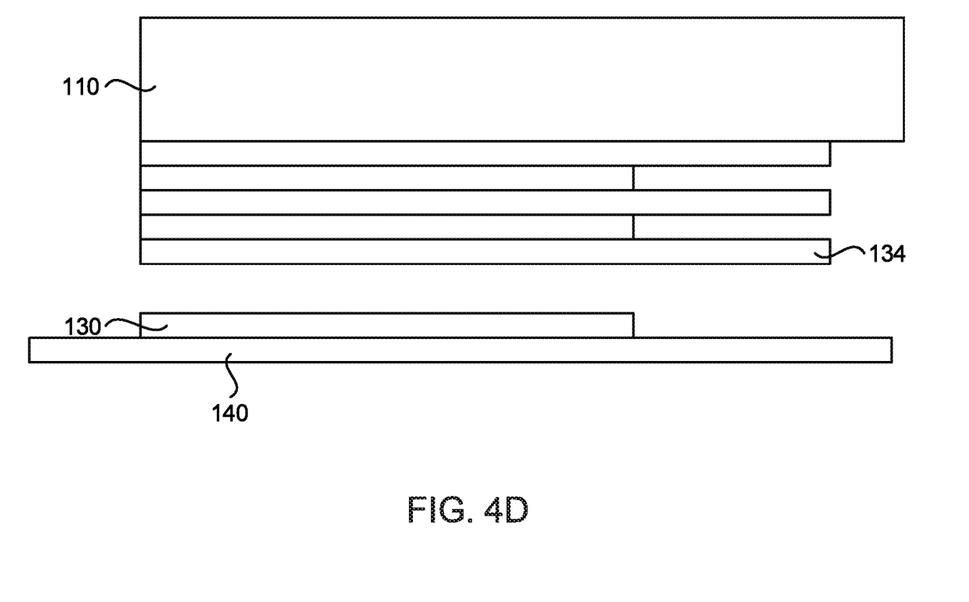

The use of the wrapping ornament 100 will be described with reference to FIGS. 4A to 4D. FIG. 4A shows an ornament having an ornament element 110 and a stack 122 of double-sided adhesive tape layers 126. In this example, three separate adhesive tape layers 126 are shown, each separated by a release liner 125. To use the wrapping ornament 100, the outermost release line 127 of the stack 122 is removed to expose and activate the adhesive of the underlying tape layer 130 (FIG. 4B). This layer 130 may then be applied and stuck to an object 140, such as a wrapping paper surface (FIG. 4C). Ordinarily, a wrapping ornament would be discarded with the wrapping once the wrapping had been removed from the present or gift. In the case of the wrapping ornament 100 of the present application, the wrapping ornament may be removed from the wrapping and retained. To remove the wrapping ornament the user may grip the next outermost release liner 134 by its respective free tab 129 and pull to remove the release liner 134 from the adhesive layer 130 that is adhered to the wrapping paper 140. Thus, the wrapping ornament and remaining layers of the stack 122 are removed from the wrapping paper, while the adhesive tape layer 130 remains stuck to the wrapping paper (FIG. 4D). The wrapping ornament 100 may now be stored for later use, with the release liner 134, now being the outermost layer, protecting the stack 122 from undesirably sticking to other surfaces until required for another gift.

The wrapping ornament may be reused until the number of adhesive tape layers has been exhausted. In this present example of FIGS. 4A-4D, the ornament may be used three times. The stack 122 may include any number of adhesive tape layers 126. However, too many and the aesthetic appeal of the wrapping ornament is reduced due to the thickness of the stack. The present Applicant has found approximately 5 layers in the stack to provide a balance between being able to reuse the wrapping ornament a useful number of times and the aesthetic look of the wrapping ornament though as many as 50 adhesive layers may be provided.

While the method describes applying the ornamental product onto wrapping, the product may alternatively be applied directly onto the gift or any other item.

The attachment elements are depicted herein as rectangle tape layers. Other shapes of adhesive layers are contemplated, including triangles, circles, ellipses, etc. Adhesive-free tabs for facilitating separation may be incorporated into any of these shapes as required.

The stack 122 is described as having adhesive tape layers 126 separated by release liners 125. Each adhesive tape layer is selectively exposable by removing the release liners. In alternative embodiments, the stack may include substrate layers, such as paper or card, directly adhered to each other by a selectively activated adhesive. As the outermost layer is removed, the adhesive surface of the next underlying layer is selectively exposed.

Figure 5:
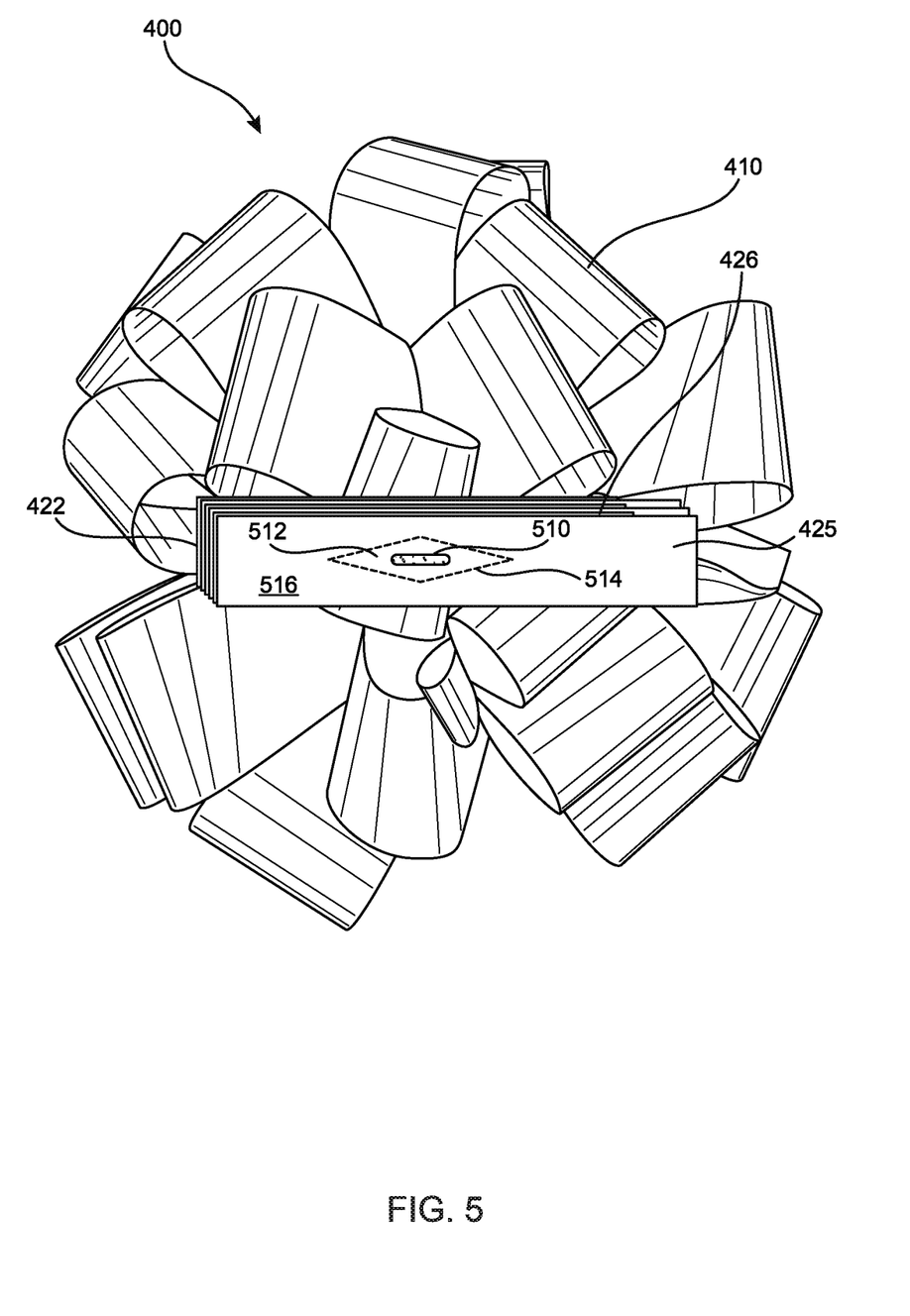
FIG. 5 substantially shows a bottom view of a stack of adhesive elements having a perforation for facilitating removal.

In one embodiment the stack 122 is secured to the ornament element 110 by a fixing device such as a staple, rivet stitches, etc. FIG. 5 depicts an embodiment 400 where a stack 422 of adhesive elements is secured to the ornament element 410 by a fixing device in the form of a staple 510. The staple 510 passes through each layer of the stack 422 through to the ornament element 410, i.e. through each adhesive tape layer 426 and through each release liner 425. It has been found that having the fixing device 510 pass through each layer of the stack 422 can simplify the construction of the reusable ornament 100. The staple 510 is located in a central attachment region 512. While one fixing device 510 is shown, multiple fixing devices may be used in multiple attachment regions 512.

To facilitate removal of the layers of the stack 422, the perimeter of the attachment region 512 on each layer 425, 426 may comprise a perforation 514. The perforation 514 separates the respective layer 425, 426 into a fixed portion comprising the attachment region 512, and a removable portion 516 comprising the remainder of the layer, that allows easy tearing and separation around the staple 510.

The perforations may be formed by any suitable perforation technique, including, without limitation, laser and pin techniques.

Figure 6:
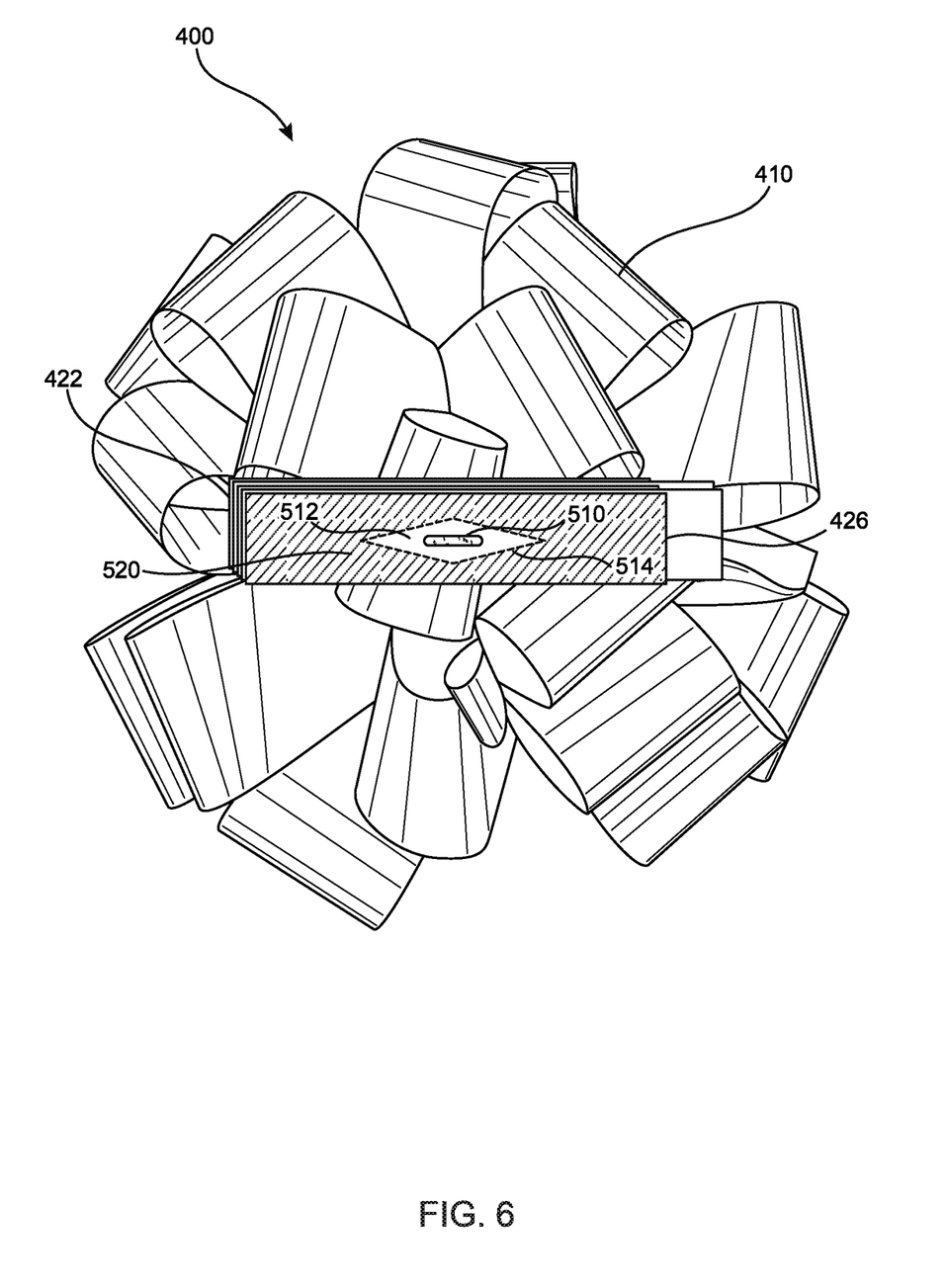
FIG. 6 substantially shows the bottom view of FIG. 5 after removal of the release layer.

FIG. 6 shows the bottom of the ornament device 400 and shows that the removable portion 516 of the release liner 425 has been removed to expose the adhesive 520 of the underlying adhesive tape layer 426. The adhesive 520 (shaded area) is exposed across the layer, except for a fixed portion 512 which has remained secured around the staple 510.

When the adhesive layer 426 is applied to wrapping, only the adhesive portion 520 will adhere to the wrapping because the fixed portion of the adhesive layer 426 remains hidden under the fixed portion of the release liner, secured by the staple 510. When the ornament 400 is removed from the wrapping, the fixed portion of the adhesive layer will remain with the ornament 400, secured by the staple 510, and the adhesive layer 426 will remain on the wrapping with a cutout in the shape of the fixed portion. That is, the fixed portion of each layer remains as successive layers of the stack 422 are removed. Each layer 425, 426 of the stack 422 may therefore be considered to include one or more removable portions and one or more fixed portions. These portions become separated as the layer is removed from the stack.

The perforation 514 is formed in a diamond shape in the embodiment of FIG. 5. The person skilled in the art will understand that different shaped perforated perimeters may be produced to surround the attachment device 510, including circles, rectangles, diamonds, etc.

Figure 7:
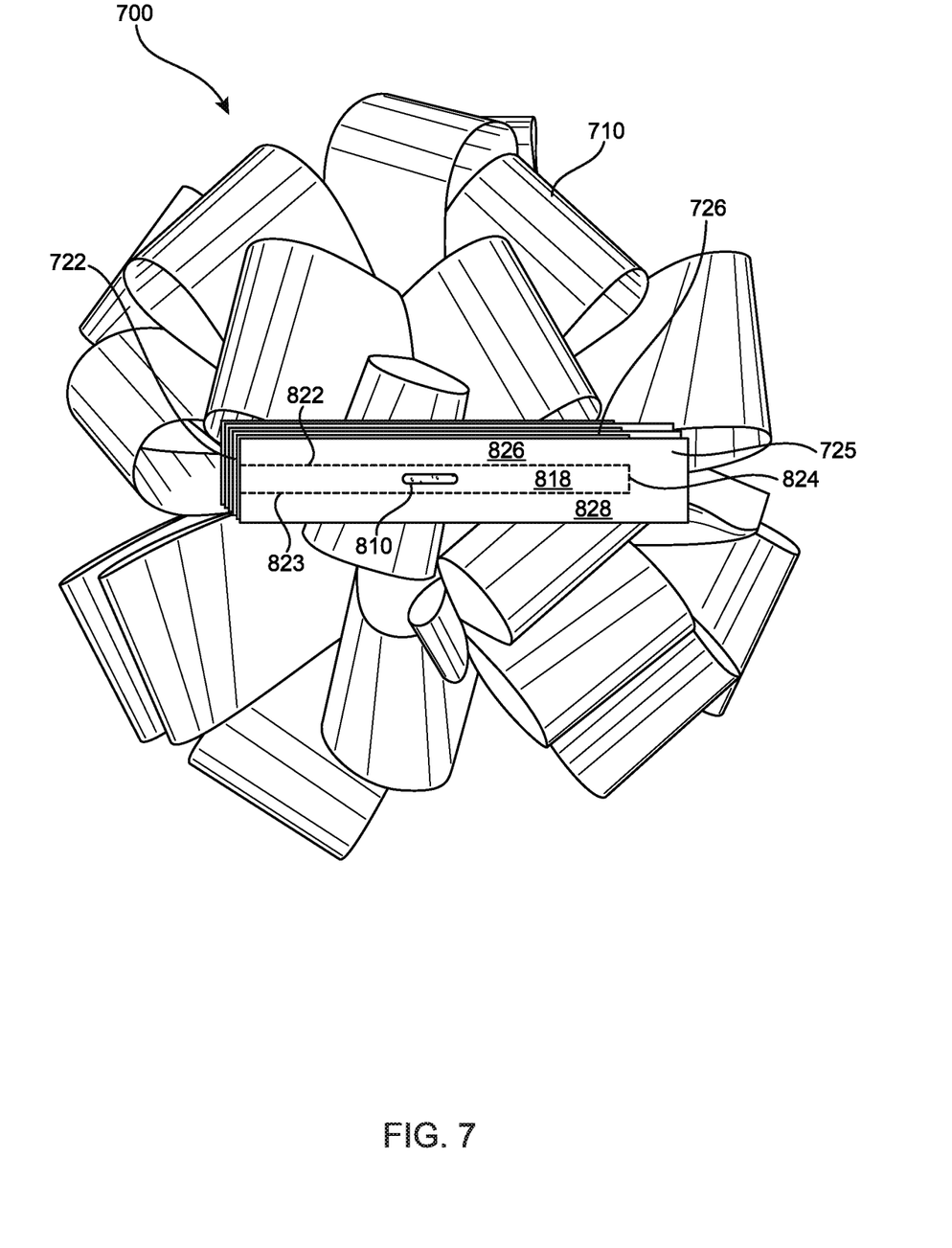
FIG. 7 substantially shows a bottom view of a stack of adhesive pads with an alternative perforation arrangement.
Figure 8:
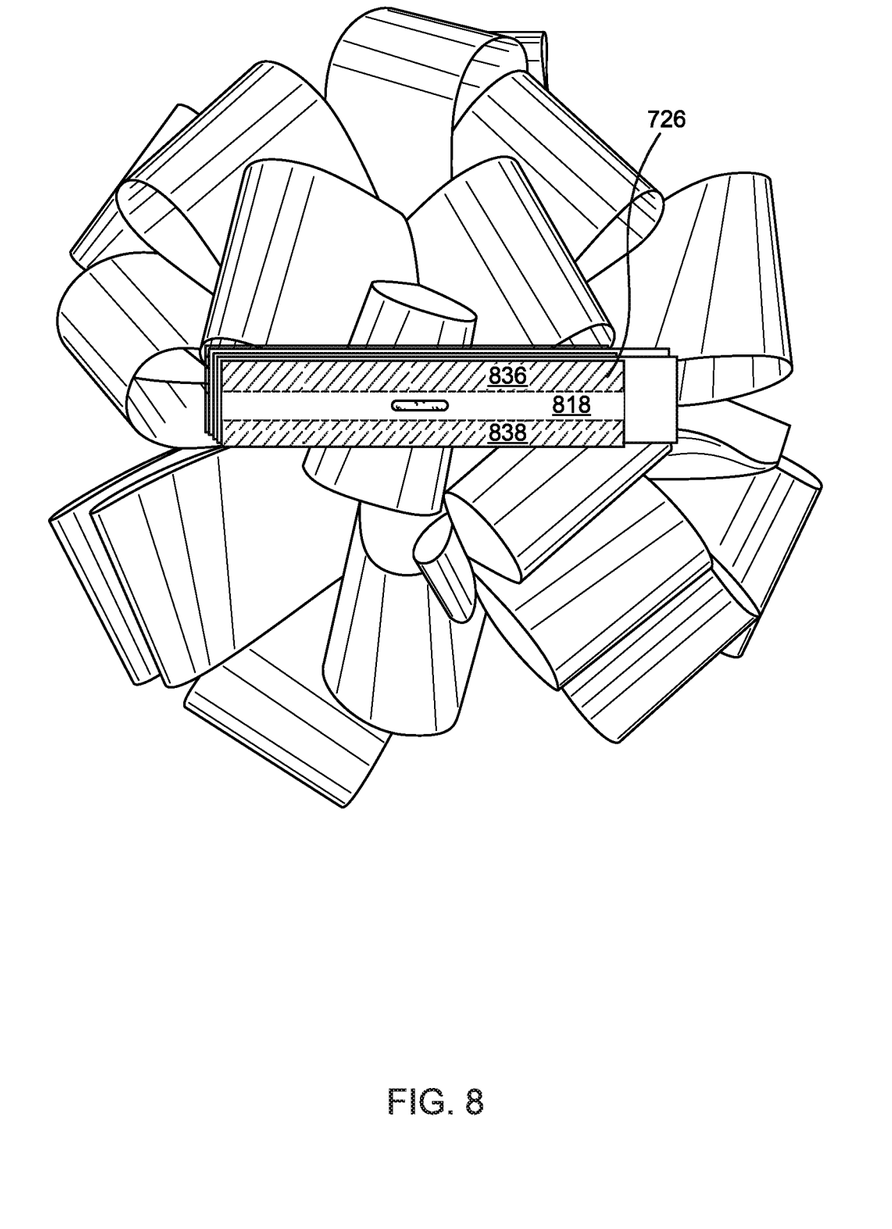
FIG. 8 substantially shows the bottom view of FIG. 7 after removal of the release layer.

A further embodiment of a wrapping ornament 700 is depicted in FIG. 7. In this embodiment a stack 722 of adhesive elements is secured to an ornament element 710 by a staple of similar fixing 810. Perforations are formed that do not form a complete perimeter around the attachment device 810. Instead, two perforations 822, 823 are formed across the layer for the width of the adhesive layer 726. On the release liner layers 725, an adjoining perforation 824 joins the perforations 822, 823. The perforations 822, 823 divide the layer 725, 726 into the fixed portion 818 and two removable portions 826, 828. When the release layer 725 is removed, two strips 836, 838 of the underlying adhesive layer are exposed (shaded area FIG. 8), while a fixed portion of the adhesive layer remains covered by the fixed portion 818 of the release liner. The exposed adhesive layer can be applied to wrapping. When the ornament 700 is removed, the adhesive layer 726 will tear at its perforations 822, 823 to leave two discrete strips of adhesive tape on the wrapping, while the remained of the ornament 700 is removed.

Alternative shapes and arrangements of the perforations will be apparent to the person skilled in the art.

Figure 9:
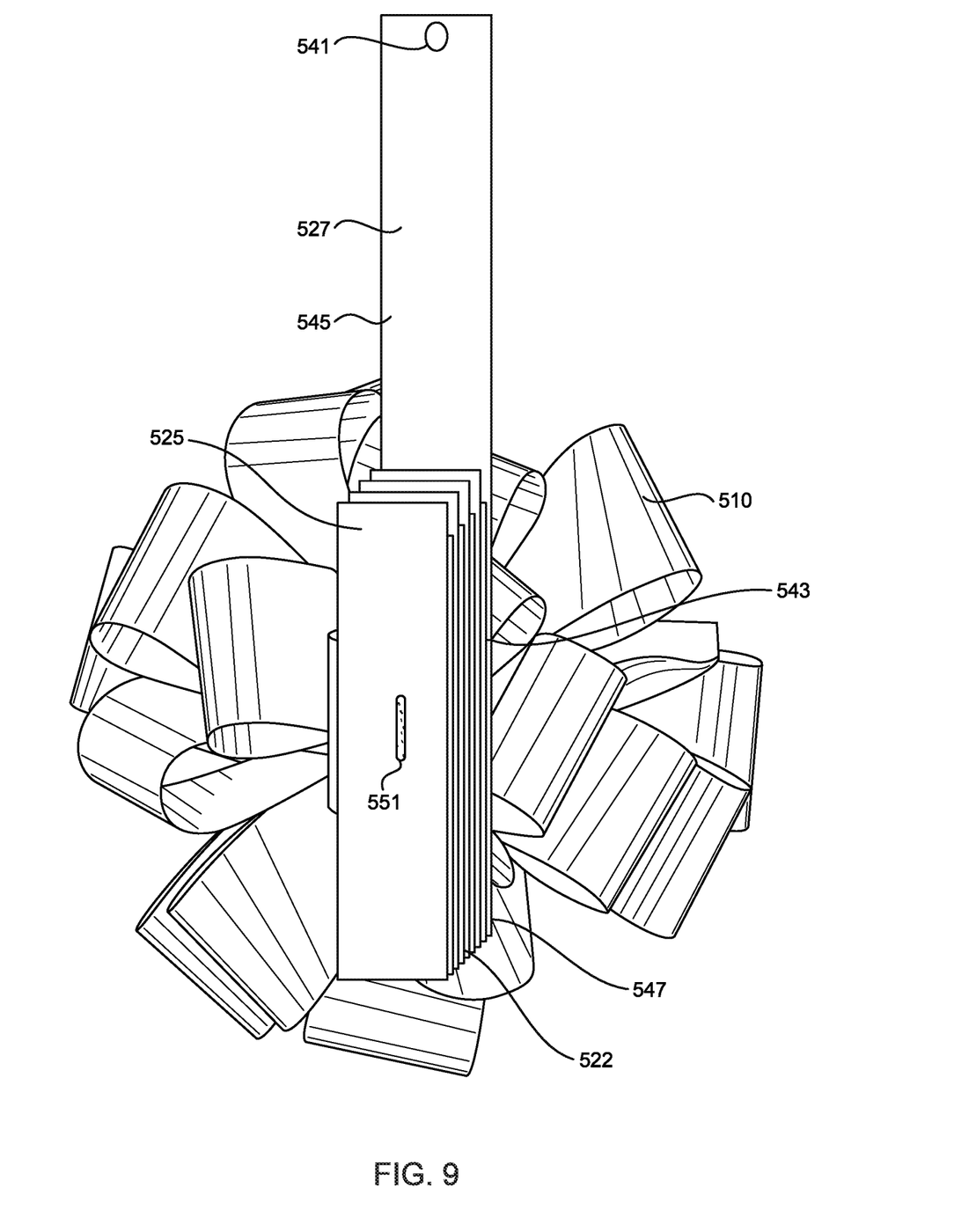
FIG. 9 substantially shows an example of how to add a hangtag to a bow for retail purposes.
Figure 10:
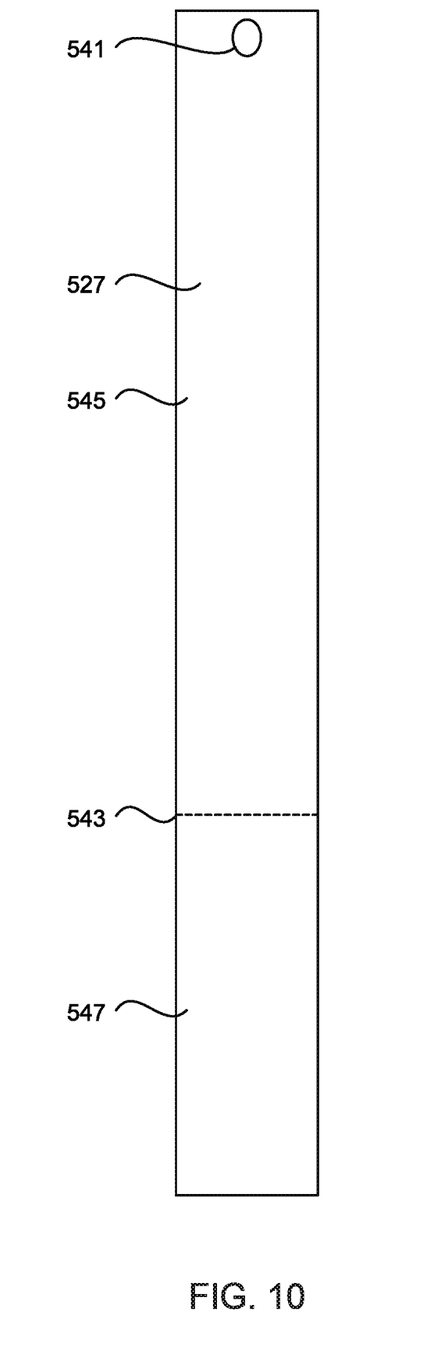
FIG. 10 substantially shows a hangtag.

An alternative embodiment of the invention is depicted in FIG. 9. In this embodiment a hangtag 527 is extended to beyond a border of the ornament element 510. The hangtag 527 can be attached to a stack 522 of adhesive elements using a staple or another suitable fastener. The hangtag 527 does not have an adhesive and is attached (see example attachment point 551) to both the stack 522 of adhesive elements and the ornament element 510. A hole 541 is provided in an end of the hangtag 527. The hangtag 527 is shown in isolation in FIG. 10. The hole 541 may be used to hang the decorative ornament on a sales hook. Sales indicia, such as price, bar code, etc. may be printed on the front and back faces of the hangtag 527. A perforation 543 may optionally extend across the hangtag. This allows the top portion 545 of the hangtag 527 to be removed after sale. The second perforation 543 may be placed anywhere on the hangtag 527 that is above the outward of the attachment point 551 of the hangtag 527 to the ornament 510. The hangtag 527 may be thicker and stronger than the release liners 525.

Figure 11:
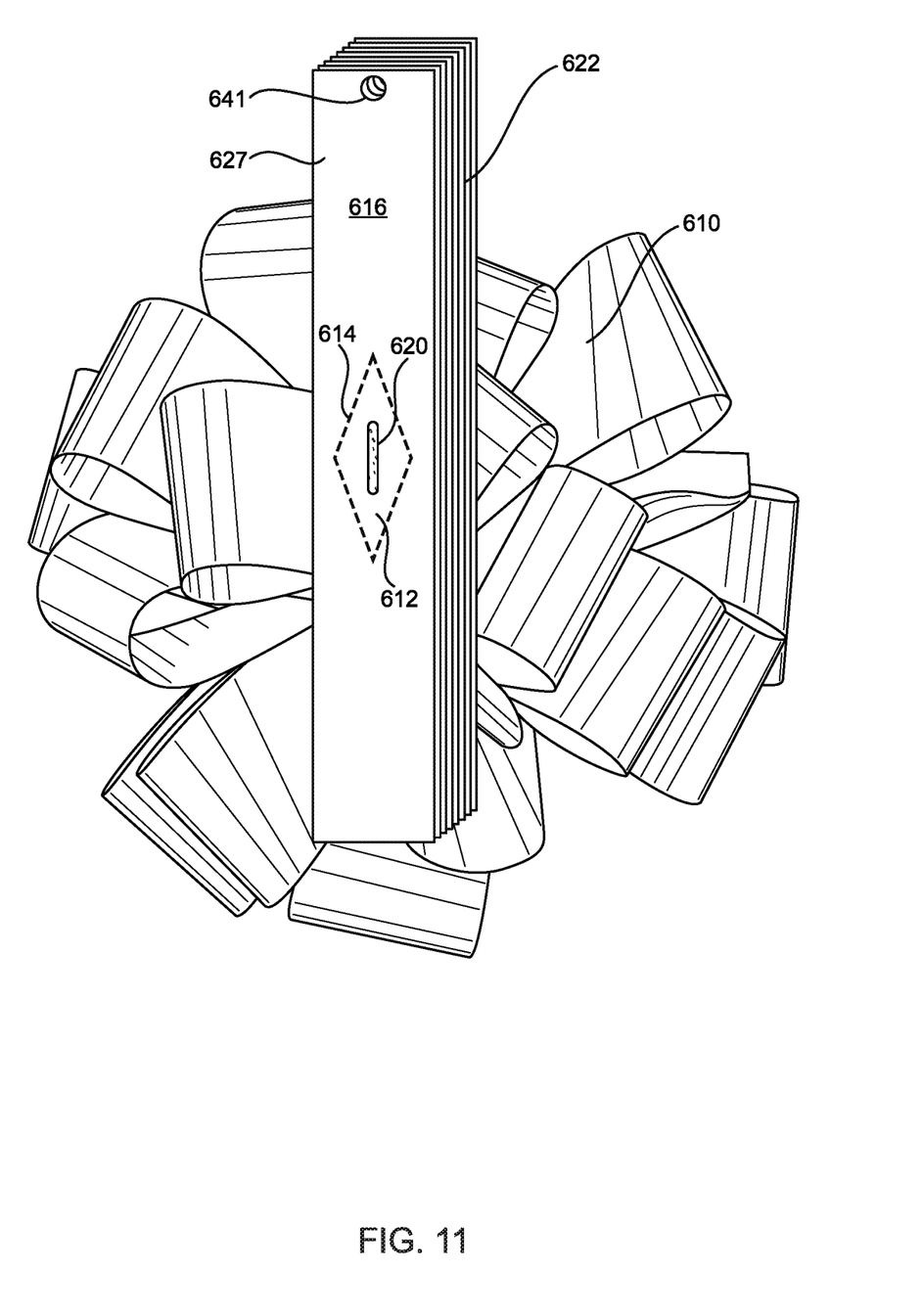
FIG. 11 substantially shows a multi layered hangtag embodiment.

A multilayered hangtag embodiment is depicted in FIG. 11. In this embodiment the stack 622 comprises a stack of adhesive elements 627. Each adhesive element 627 may be a paper, card, or similar material with an adhesive, such as a selectively activatable or pressure sensitive adhesive, running the whole length of adhesive element 627 on one side of each layer that is used to secure successive adhesive elements 627 to each other. The top ply of the stack 622 can be made of a printable paper or film. Each adhesive element 627 includes a hole 641 at the outward end to enable the ornament to be hung on a hook for display. Between each adhesive element 627 is a peel away liner (not shown). A consumer pulls back the outermost adhesive element layer 627 to selectively release or expose the peel away liner between that adhesive element 627 and the next underlying adhesive element 627. The wrapping ornament 610 can then be stuck to a gift. When the wrapping ornament 610 is removed from the wrapping, the outer layer will stay sticky until the consumer pulls back the next layer to expose the next layer of adhesive. This embodiment does not require adhesive tape layers to be provided between each adhesive element 627. However, if preferred, shorter adhesive tape layers can be placed between the layers in place of the pressure sensitive adhesive. Optionally, the multilayered hangtag embodiment may include the second perforation 543 shown in FIG. 10 to allow the top portion to be easily removed after sale.

In the embodiment shown in FIG. 11, the stack 622 is secured to the ornament element 610 by a fixing device such as a staple, rivet stitches, etc. FIG. 11 depicts an embodiment where a stack 622 of adhesive elements 627 is secured to the ornament element 610 by a fixing device in the form of a staple 620. The staple 620 passes through each layer of the stack 622 through to the ornament element 610, i.e. through each adhesive tape layer 627 and through each peel away liner. It has been found that having the fixing device 620 pass through each layer of the stack 622 can simplify the construction of the reusable ornament 610. The staple 620 is located in a central attachment region 612. While one fixing device 620 is shown, multiple fixing devices may be used in multiple attachment regions 612.

To facilitate removal of the layers of the stack 622, the perimeter of the attachment region 612 on each layer 627 may comprise a perforation 614. The perforation 614 separates the respective layer 627 into a fixed portion comprising the attachment region 612, and a removable portion 616 comprising the remainder of the layer 627, that allows easy tearing and separation around the staple 620. The perforations 614 may be formed by any suitable perforation technique, including, without limitation, laser and pin techniques.

Optionally the perforations 614, 514, 824, 822 may comprise at least one kiss cut perforation. Generally, kiss cutting is a die cutting process where adhesive-backed foils or papers are cut through, but the laminated backing paper is not. The process got its name because the kiss cutting knife or the steel rule die cuts through the self-adhesive material, but only "kisses" the backing paper without cutting it.

Although the description above contains many specifications, these should not be construed as limiting the scope of the invention but as merely providing illustrations of some of the embodiments of this invention. Thus, the scope of the invention should be determined by the appended claims and their legal equivalents rather than by the examples given.

What is claimed is:

1. A decorative ornament for use on wrapping, the decorative ornament comprising: (A) an ornament element; (B) a reusable attachment element secured to the ornament element, the reusable attachment element comprising a stack of selectively exposable adhesive elements that enable the reusable attachment element to be adhered to wrapping, wherein each of the selectively exposable adhesive elements of the stack comprises an adhesive tape layer and a release liner, wherein each of the adhesive tape layer and the release liner comprise a fixed portion and a removable portion, wherein each respective fixed portion and each respective removable portion are separated by at least one perforation; (C) wherein each of the selectively exposable adhesive elements includes an adhesive portion configured to adhere to the wrapping when each removable portion of each respective release liner is removed; (D) wherein each fixed portion of each respective adhesive tape layer remains hidden under each fixed portion of each respective release liner when each removable portion of each respective release liner is removed; (E) at least one fixing device for fixing the reusable attachment element to the ornament element; (F) wherein the at least one fixing device passes through each respective fixed portion of the stack of the selectively exposable adhesive elements; (G) wherein each adhesive element in the stack of the selectively exposable adhesive elements is directly adhered to each other by a selectively activatable adhesive; and (H) wherein each of the at least one perforation comprises a plurality of perforations surrounding the at least one fixing device, so as to separate the stack of selectively exposable adhesive elements into each respective fixed portion located inside the plurality of perforations and each respective removable portion located outside the plurality of perforations, thereby allowing easy separation of around the at least one fixing device.

2. The decorative ornament of claim 1 wherein each respective release liner comprises at least one hangtag that extends beyond a boundary of the ornament element wherein the at least one hangtag comprises a hole at an end of the hangtag that enables the decorative ornament to be hung on a hook.

3. The decorative ornament of claim 2 wherein the at least one hangtag comprises a perforation that enables an end of the hangtag that extends beyond the boundary of the ornament element to be separated from the reusable attachment element.

4. The decorative ornament of claim 1 wherein each adhesive element in the plurality of the selectively exposable adhesive elements comprises a hole at an end of the adhesive element that enables the decorative ornament to be hung on a hook.

5. The decorative ornament of claim 1 further comprising 10 to 20 of the adhesive tape layers separated by the release liners.

6. The decorative ornament of claim 1 wherein the ornament element comprises a ribbon arrangement.

7. The decorative ornament of claim 6 wherein the ribbon arrangement comprises a ribbon flower.

8. The decorative ornament of claim 1 wherein the plurality of perforations defines at least one perimeter around each fixed portion.

9. The decorative ornament of claim 1 wherein the at least one fixing device comprises at least one of a staple, a rivet, and a stitch.

* * * * *